US008343453B2

(12) United States Patent
Yamada et al.

(10) Patent No.: US 8,343,453 B2
(45) Date of Patent: Jan. 1, 2013

(54) CARRIER CORE MATERIAL FOR ELECTROPHOTOGRAPHIC DEVELOPER AND METHOD FOR PRODUCING THE SAME, CARRIER FOR ELECTROPHOTOGRAPHIC DEVELOPER, AND ELECTROPHOTOGRAPHIC DEVELOPER

(75) Inventors: Tomoya Yamada, Okayama (JP); Isao Fujita, Okayama (JP); Yoshiaki Aiki, Okayama (JP)

(73) Assignees: Dowa Electronics Materials Co., Ltd., Tokyo (JP); Dowa IP Creation Co., Ltd., Okayama (JP)

( * ) Notice: Subject to any disclaimer, the term of this patent is extended or adjusted under 35 U.S.C. 154(b) by 507 days.

(21) Appl. No.: 12/450,090

(22) PCT Filed: Mar. 26, 2008

(86) PCT No.: PCT/JP2008/055738

§ 371 (c)(1), (2), (4) Date: Nov. 20, 2009

(87) PCT Pub. No.: WO2008/120637

PCT Pub. Date: Oct. 9, 2008

(65) Prior Publication Data

US 2010/0086869 A1 Apr. 8, 2010

(30) Foreign Application Priority Data

Mar. 30, 2007 (JP) ................................ 2007-094537

(51) Int. Cl.

*C01G 49/06* (2006.01)
*G03G 9/107* (2006.01)

(52) U.S. Cl. ........ 423/599; 423/632; 423/633; 423/634; 430/111.31

(58) Field of Classification Search ............... 430/111.1, 430/111.3, 111.31, 111.32, 111.33; 428/402; 252/62.56; 423/599, 632, 633, 634

See application file for complete search history.

(56) References Cited

U.S. PATENT DOCUMENTS 4,855,205 A * 8/1989 Saha et al. ............... 430/111.33
2009/0130587 A1* 5/2009 Kayamoto et al. ....... 430/111.32

FOREIGN PATENT DOCUMENTS

| | | |
|---|---|---|
| JP | A-10-104884 | 4/1998 |
| JP | A-2001-290311 | 10/2001 |
| JP | A-2006-337828 | 12/2006 |
| WO | WO 2007/063933 A1 | 6/2007 |

* cited by examiner

*Primary Examiner* — Janis L Dote
(74) *Attorney, Agent, or Firm* — Oliff & Berridge, PLC

(57) ABSTRACT

To provide a carrier for two-component electrophotographic developer not only having excellent fluidity but also having proper surface irregularities necessary for imparting electric charge, without generating cracks/chipping of particles even under an influence of stirring stress over a long period of time. A particle surface has raised parts of striped pattern extending almost continuously in a plurality of directions while being superposed on one another, with a surface formed with raised parts of striped pattern occupying 80% or more of the whole surface of a particle. Depths of grooves between the adjacent raised parts are 0.05 μm or more and 0.2 μm or less, average surface roughness Ra is 0.1 μm or more and 0.3 μm or less, roundness is 0.90 or more, and average particle size is 15 μm or more and 100 μm or less, and a carrier core material thus constituted is coated with resin. Thus, the carrier for two-component electrophotographic developer is prepared.

1 Claim, 1 Drawing Sheet

CARRIER CORE MATERIAL FOR ELECTROPHOTOGRAPHIC DEVELOPER AND METHOD FOR PRODUCING THE SAME, CARRIER FOR ELECTROPHOTOGRAPHIC DEVELOPER, AND ELECTROPHOTOGRAPHIC DEVELOPER

TECHNICAL FIELD OF THE INVENTION

The present invention relates to a carrier core material for electrophotographic developer and a manufacturing method of the same, a carrier for electrophotographic developer, and an electrophotographic developer, used in electrophotographic development.

DESCRIPTION OF RELATED ART

A carrier for electrophotographic developer (described as a carrier hereinafter) in a two-component electrophotographic development method, has not only a function of giving electric charge to toner by being stirred as a mixture with the toner in a developing unit, but also a function of serving as a catalyst carrier of carrying the toner onto a photoreceptor. The carrier after carrying the toner is remained on a magnet roll and mixed with the toner again in the developing unit. Therefore, the carrier is requested to have charging properties of imparting a desired charge to the toner and durability in repeated use.

Conventionally, in order to impart a sufficient charging capability to toner particles, measures such as making particle sizes of carrier particles smaller and making a specific surface area larger have been taken. However, there is a great problem that the carrier, with particle sizes made smaller, easily allows abnormal phenomenon to occur such as adhesion of carrier and scattering of carrier.

In order to cope with this problem, a magnetic substance with high magnetic susceptibility such as magnetite and manganese ferrite is suitably used, because scattering can be suppressed by higher magnetic susceptibility of the carrier particles.

Further, the carrier particles are requested to have a good fluidity, to prevent the toner from being broken during mixing and stirring in the developing unit, and to prevent excessive load from being added on a drive part of a magnet roll.

As the shape of each carrier particle with good fluidity, a spherical shape or ideally a true spherical shape is preferable. However, when the shape of the carrier particle is a complete true sphere, frictional charging hardly occurs, and therefore sufficient electric charge can not be imparted to the toner. Accordingly, proper irregularities not damaging the fluidity are preferably formed on the surfaces of the carrier particles.

From such a viewpoint, for example, patent document 1 proposes a manganese ferrite carrier core material, with an upper surface divided into 2 to 50 areas per 10 μm square, by grooves and stripes.

Patent document 1:
Japanese Patent Laid Open Publication No. 2006-337828

DISCLOSURE OF THE INVENTION

Problem to be solved by the Invention

However, as a result of studying by the inventors of the present invention, it is confirmed that conventional carrier particles including those of the patent document 1 involve a problem that durability of the carrier particles is not sufficient, thus causing cracks/chipping of the carrier particles to occur during stirring process in a developing machine. Therefore, fluidity and electric charge imparting capability of the carrier particles are changed by the cracks/chipping, and it is difficult to obtain a stable image characteristic over a long period of time.

After an examination of a generation state of the aforementioned cracks/chipping of particles, it is confirmed that such cracks/chipping are generated by lack of an independent portion in island-shape divided by grooves on a particle surface, namely lack of grains. According to a conventional technique including the carrier particles of patent document 1, the grooves that exist on the surfaces of the carrier particles are generated, accompanying with particle growth during sintering. However, segregation of impurities occurs at this groove-like grain boundary part and a bonding force is weak, and therefore it is considered that by adding a stress by stirring, separation of the grains occurs.

In order to prevent the generation of the cracks/chipping, the sizes of the grains need to be made large one by one, to thereby lessen the grain boundary portions. However, there is a contradictory problem that by lessening the grooves on the surfaces of the particles, surface irregularities of the particles are reduced, and the electric charge imparting capability is lowered.

In view of the above-described circumstances, an object of the present invention is to provide a carrier for two-component electrophotographic developer not only having excellent fluidity but also having suitable surface irregularities necessary for imparting electric charge, without generating cracks/chipping of particles even under an influence of a stirring stress over a long period of time.

Means for Solving the Problem

After strenuous efforts by inventors of the present invention, in studying on suppression of cracks/chipping of a carrier under a stirring stress, it is found that the surface of the carrier has an extremely high durability, when a particle surface is not divided into island-like grains by grooves, etc, and the surface is covered with irregularities formed by raised parts of striped pattern. Further, the inventors of the present invention considers it important that the surface of the carrier core material for electrophotographic developer constituting the carrier by coating the core material with resin (described as a carrier core material in some cases hereinafter), being the core material of the aforementioned carrier, is not divided into island-like grains, but is covered with irregularities formed by raised parts of striped pattern. When the surface of the carrier core material is covered with irregularities formed by the raised parts of striped pattern, it is found that the carrier, with the surface of its carrier core material covered with irregularities formed by the raised parts of striped pattern, has extremely high durability, and the present invention is thereby completed.

Namely, first means for solving the problem provides a carrier core material for electrophotographic developer having raised parts of striped pattern extending continuously in a plurality of directions while being superposed on one another, on a particle surface.

Second means provides the carrier core material for electrophotographic developer according to the first means, wherein the surface on which the raised parts of striped pattern are formed occupies 80% or more of the whole surface of a particle.

Third means provides the carrier core material for electrophotographic developer according to first or second means, wherein depths of grooves between the adjacent raised parts are 0.05 μm or more and 0.2 μm or less.

Fourth means provides the carrier core material for electrophotographic developer according to any one of the first to third means, wherein average surface roughness Ra is 0.1 μm or more and 0.3 μm or less.

Fifth means provides the carrier core material for electrophotographic developer according to any one of the first to fourth means, wherein roundness is 0.90 or more.

Sixth means provides the carrier core material for electrophotographic developer according to any one of the first to fifth means, wherein an average particle size is 15 μm or more and 100 m or less.

Seventh means provides the carrier core material for electrophotographic developer according to any one of the first to sixth means, wherein a composition is magnetite or manganese ferrite.

Eighth means provides a manufacturing method of a carrier core material for electrophotographic developer, including the steps of:

weighing and mixing prescribed raw material powders, then adding water to this mixture to prepare slurry, and granulating this slurry by spray-drying, to prepare precursor particles;

sintering the precursor particles in a temperature range of 1000 to 1300° C., to prepare a sintered material containing magnetite or manganese ferrite;

making this sintered material drop naturally into 2000° C. or more flame of flammable gas and oxygen from an upper side of this burning flame, or applying thereto heat treatment by dispersing this sintered material into the burning flame by using carrier gas, to form raised parts of striped pattern extending continuously in a plurality of directions while being superposed on one another, on a particle surface of a material to be treated; and obtaining the carrier core material having a desired particle size distribution, by classifying particles after this heat treatment by shifter.

Ninth means provides a carrier for electrophotographic developer, which is formed by coating the carrier core material according to any one of the first to seventh means, with resin.

Tenth means provides an electrophotographic developer, including the carrier for electrophotographic developer according to ninth means, and toner.

Advantage of the Invention

A carrier for electrophotographic developer obtained by resin-coating a magnetic carrier core material for electrophotographic developer according to the present invention allows no cracks/chipping of particles to occur even under an influence of a stirring stress over a long period of time, and has good fluidity.

BEST MODE FOR CARRYING OUT THE INVENTION

A carrier core material of the present invention has raised parts of striped pattern extending almost continuously in a plurality of directions while being superposed on one another on a particle surface. A state of having the raised parts of striped pattern on the particle surface according to the present invention means a shape like an example shown in SEM photograph of FIG. 1, wherein a plurality of linear raised parts are annularly formed almost continuously, like a surface as shown in a ball wrapped with woolen yarn, and an infinite number of minute irregularities are contiguous to one another in a wavelike form in in-surface directions. Namely, there is a clear difference from a carrier of a conventional example shown in the SEM photograph of FIG. 2, wherein a plurality of grains exist in independent island shapes.

Thus, by an existence of a plurality of linear raised parts formed annularly, proper irregularities are generated on the surface even in a carrier, with carrier particles coated with resin, and a sufficient electric charge can be imparted to toner, and also excellent durability can be exhibited. Further, these raised parts of striped pattern are extended, for example, in three directions, and preferably in five directions or more. With this structure, the raised parts are contiguous to one another on the surface of each carrier particle. Thus, major part of the area on the particle surface is covered with the raised parts. As a result of a study by inventors of the present invention, it is found that when these raised parts occupy 80% or more of the particle surface, the carrier particularly excellent in durability and fluidity can be obtained.

Note that the particle surface of the carrier core material according to a conventional example of FIG. 2 is covered with grains having independent polygonal or circular shape. However, in this surface structure, drop of the grain is easily generated as described above, and durability is deteriorated. Meanwhile, in a case of the carrier core material, with its surface covered with the raised parts of striped pattern as shown in the present invention, bonding of the grains is firm, and therefore excellent durability can be exhibited even under a stirring stress over a long period of time.

The depths of grooves between raised parts that exist on the surface of the carrier core material are preferably set to be 0.05 μm or more and 0.2 μm or less. When the depth of the grooves is set to be 0.05 μm or more, sufficient frictional electric charge is generated, and sufficient electric charge can be imparted to the toner during stirring. Also, when the depth of the grooves is set to be 0.2 μm or less, hooking of the particles with each other is not generated, and the fluidity is improved.

Further, in the carrier core material of the present invention, an average surface roughness Ra of the particles is preferably set to be 0.1 μm or more and 0.3 μm or less. This is because when Ra is set to be 0.1 μm or more, electric charge imparting characteristic is ensured by surface irregularities. Also this is because when Ra is 0.3 μm or lower, the fluidity is ensured.

Also, a roundness of the carrier core material according to the present invention is preferably set to be 0.90 or more. This is because by setting the roundness to be 0.90 or more, the carrier has extremely excellent fluidity.

Also, the particle size of the carrier core material according to the present invention is preferably set to be 15 μm or more and 100 μm or less.

When the particle size of the carrier core material is set to be 15 μm or more, magnetization per one particle can be ensured, and scattering of the carrier can be suppressed. Also, when the particle size of the carrier core material is set to be 100 μm or less, deterioration of the image characteristic can be prevented.

In addition, the substance, becoming the carrier core material according to the present invention, is preferably magnetite or manganese ferrite. This is because these substances have sufficiently high magnetization and can suppress the scattering of the carrier as described above.

Then, the carrier core material according to the present invention is coated with silicone-based resin for imparting electric charging property and improving durability, to become the carrier. Regarding a coating method, a publicly-known method may be used. According to the study by the inventors of the present invention, by using the carrier core material according to the present invention as a core material of the carrier, cracks/chipping of the particles is not generated even under an influence of stirring stress over a long period of time, and the carrier having excellent fluidity can be obtained.

The manufacturing method of the carrier core material according to the present invention will be described hereinafter.

The carrier core material according to the present invention is manufactured by applying surface treatment to magnetic particles, being materials to be treated, at an extremely high temperature for an extremely short time. By performing such a treatment, the carrier core material having high roundness and proper surface irregularities, and further having a surface structure excellent in durability, can be manufactured.

Explanation will be given for a method of manufacturing the carrier core material of the present invention, with the steps divided into a granulating step of particles, becoming a precursor; a sintering step of obtaining a magnetic phase; and a surface treatment step of forming the raised parts of striped pattern extending continuously in a plurality of directions while being superposed on one another on the surface.

[Slurrying and Granulating]

In order to obtain the particles, becoming a precursor, of the carrier core material, a publicly-known granulating method may be used. However, particularly a spray-drying method is suitably used. When granulating is performed by splay-drying, the raw material powders are mixed into water and are dispersed therein, to prepare slurry, and thereafter by splaying drying air, the precursor particles having a desired particle size distribution can be obtained.

A solid content concentration of the slurry is preferably adjusted between 50% and 90%. In order to maintain a particle shape of a granulated material, it is effective to add binder to water. For example polyvinyl alcohol can be suitably used as the binder, and the concentration in its medium liquid may be set to be about 0.5 to 2 mass %. Generally, a dispersant is added to the slurry. However, for example, polycarboxyl ammonium-based dispersant can be suitably used as the dispersant, and the concentration in the medium liquid may be set to be about 0.5 to 2 mass. In addition, phosphorus and boric acid can be added as a lubricant agent and a sintering accelerator.

As the raw material powders, when magnetite, for example, is manufactured, metal Fe, $Fe_3O_4$, $Fe_2O_3$, etc, are suitably utilized, and when manganese ferrite is manufactured, metal Fe, $Fe_3O_4$, $Fe_2O_3$, and metal Mn, $MnO_2$, $Mn_2O_3$, $Mn_3O_4$, and $MnCO_3$ are weighed and mixed in a prescribed ratio.

[Sintering]

Next, the precursor particles obtained by granulation is sintered, to prepare a magnetic phase. Sintering is performed by charging granulated powders into a heated furnace and heating them for a prescribed time. A sintering temperature may be set to a temperature range for generating the magnetic phase, being a target. However, when magnetite $Fe_3O_4$ and manganese ferrite $MnFe_2O_4$ are manufactured, sintering may be performed in a temperature range of 1000 to 1300° C.

[Surface Treatment]

In order to obtain the shapes of the carrier particles of the present invention, it is important to apply surface treatment to the aforementioned sintered material by heat treatment for a short time, at a high temperature of 2000° C. or more, and preferably at 3000° C. or more. Such a surface treatment can be performed by charging a material to be treated, into a flame of, for example, flammable gas and oxygen. As this flammable gas, propane gas, propylene gas, and acethylene gas are suitable, and is used by mixing oxygen or air. A supply amount of mixed oxygen and air may be adjusted so that the oxygen in a range of 0.2 times to 1.5 times, and more preferably 0.5 times to 1.2 times of an amount required for causing complete burning of the flammable gas, is supplied. A general gas burner, etc, may be used for generation of a burning flame.

However, in order to form on the particle surface, the raised parts of striped pattern extending continuously in a plurality of directions while being superposed on one another, it is required that the supply amount of the mixed gas is increased and a gas flow speed is set to be faster. A pressure of the mixed gas is in a range of 0.1 MPa to 1.5 MPa, and more preferably 0.3 MPa to 1.0 MPa, and the supply amount is in a range of 1.0 $m^3/h$ to 30 $m^3/h$, and more preferably 3.0 $m^3/h$ to 10 $m^3/h$. As a supplying method of the material to be treated, a system of a natural drop from the upper side of the burning flame, and a system of dispersing it into the burning flame by using carrier gas, can be given. At this time, less supply amount of the material to be treated as much as possible is preferable in a range of not lowering productivity. This is because a heat amount received by the particles one by one is uniform, and therefore variation is hardly generated in a degree of the surface treatment. Accordingly, the supply amount of the material to be treated is preferably set to be 10 kg/h or less, under the aforementioned burning flame generating condition.

[Classification]

By classifying the obtained particles by shifter, the carrier core material having a desired particle size distribution can be obtained.

[Coating]

Electric charging property is imparted to the manufactured carrier core material by coating it with resin, to prepare the carrier having improved durability. As the resin for coating, silicone resin, etc, is preferably used. Regarding a coating method, a publicly-known method may be performed.

Further, by mixing the carrier according to the present invention with a suitable toner, the elctrophotographic developer capable of obtaining stable image characteristic over a long period of time can be obtained.

EXAMPLES

Example 1

$Fe_2O_3$ (average particle size: 0.6 μm) 7.2 kg and $Mn_3O_4$ (average particle size: 0.9 μm) 2.8 kg were dispersed into pure water 3.0 kg, then pulverization processing was applied thereto by means of a wet type ball mill (media diameter 2 mm), to thereby obtain a mixed slurry of $Fe_2O_3$ and $Mn_3O_4$. Note that as the dispersant, 60 g of polycarboxyl ammonium-based dispersant was added to the pure water. This slurry was sprayed into hot air of about 130° C. by a spray drier, to thereby obtain a dried granulated material having particle size of 10 to 100 μm.

This granulated material was charged into an electric furnace and sintered for 3 h at 1150° C. After pulverizing the obtained sintered material and classifying it by shifter, ferrite powders having an average particle size of 36 μm was obtained.

The ferrite powders were charged into the burning flame of the propane gas and oxygen gas, to thereby obtain the carrier core material having the raised parts of striped pattern extending continuously in a plurality of directions while being superposed on one another. Note that a burner for generating the burning flame has gas jetting ports with diameter 1 mm arranged at equal intervals in a range of diameter 20 mm. Then, the burning flame was generated, with the mixed gas of the oxygen and propane (mixing ratio 5:1) flown in supply amount of 6.0 $m^3$/h and at pressure of 0.5 MPa.

Then, treatment was performed, such as making ferrite powders naturally drop to this burning flame from the upper side of burning at supply amount of 6 Kg/h and charging it into the burning flame, to thereby obtain a ferrite core material according to example 1. This burning flame has a sufficient energy for melting the supplied carrier particles. Further, it can be considered that by charging the ferrite particles into the burning flame having extremely high flow speed, a melting time of the ferrite particles is shortened, thus making it possible to separate out the raised parts of striped pattern extending continuously in a plurality of directions while being superposed on one another, on the surface of ferrite.

Particle size distribution measurement, fluidity degree (F.R.) measurement, groove depth measurement, average surface roughness (Ra) measurement, roundness calculation, and durability evaluation were performed to the obtained ferrite core material according to the example 1.

These measurement results are shown in table 1. However, values obtained by the particle size distribution measurement are the same as values of the particle size distribution before stirring.

Note that details of these measuring methods will be described later.

Example 2

Similar operation as that of the example 1 was performed, other than a point that the average particle size of the ferrite powders was adjusted to 29 μm by shifter, to thereby obtain the carrier core material according to example 2, with a manganese ferrite composition having the raised parts of striped pattern on the surface, extending continuously in a plurality of directions while being superposed on one another.

Similar measurement as that of the example 1 was also performed to the obtained ferrite core material according to the example 2, and the measurement results are shown in table 1.

Example 3

$Fe_2O_3$ (average particle size: 0.6 μm) 10.0 kg was dispersed into pure water 3.0 kg, and pulverization processing was applied thereto by means of the wet type ball mill (media diameter 2 mm), to thereby obtain the slurry of $Fe_2O_3$.

Note that as the dispersant, 60 g of polycarboxyl ammonium-based dispersant was added to the pure water. This slurry was sprayed into hot air of about 130° C. by a spray drier, to thereby obtain a dried granulated material having particle size of 10 to 100 μm.

This granulated material was charged into the electric furnace and sintered for 3 h at 1180° C. After pulverizing the obtained sintered material and classifying it by shifter, magnetite powders having an average particle size of 53 μm was obtained.

Thereafter, similar operation as that of the example 1 was performed, to thereby obtain the carrier core material according to example 3 with a magnetite composition having the raised parts of striped pattern on the surface, extending continuously in a plurality of directions while being superposed on one another.

Also, similar measurement was performed to the obtained ferrite core material according to the example 3, and the measurement results are shown in table 1.

Example 4

Similar operation as that of the example 3 was performed, other than a point that the average particle size of the magnetite powders was adjusted to 33 μm by shifter, to thereby obtain the carrier core material according to example 4, with a magnetite composition having the raised parts of striped pattern on the surface, extending continuously in a plurality of directions while being superposed on one another.

Similar measurement as that of the example 1 was also performed to the obtained ferrite core material according to the example 4, and the measurement results are shown in table 1.

Comparative Example 1

Similar operation as that of the example 1 was performed, other than a point that no surface treatment was performed after sintering, to thereby obtain the carrier core material having the manganese ferrite composition according to comparative example 1, having average particle size 33 μm.

Also, similar measurement as that of the example 1 was performed to the obtained ferrite core material according the comparative example 1, and the measurement results are shown in table 1.

Comparative Example 2

Similar operation as that of the example 3 was performed, other than a point that no surface treatment was performed after sintering, to thereby obtain the carrier core material with the magnetite composition according to comparative example 2, having the average particle size 55 μm.

Also, similar measurement as that of the example 1 was performed to the obtained ferrite core material according to the comparative example 2, and the measurement results are shown in table 1.

TABLE 1

| | Composition | F.R. (s) | Groove depth (μm) | Ra (μm) | Roundness | Before stirring D50 (μm) | After stirring D50 (μm) | Before stirring −22 μm Volume ratio (%) | After stirring −22 μm Volume ratio (%) | Generation amount of fine-particle (%) |
|---|---|---|---|---|---|---|---|---|---|---|
| Example 1 | Manganese ferrite | 22.6 | 0.15 | 0.26 | 0.95 | 35.9 | 35.4 | 1.1 | 1.4 | 0.3 |
| Example 2 | Manganese ferrite | 28.8 | 0.15 | 0.28 | 0.94 | 28.7 | 28.4 | 9.2 | 9.2 | 0.0 |
| Example 3 | Magnetite | 19.5 | 0.13 | 0.22 | 0.95 | 52.9 | 52.2 | 0.0 | 0.0 | 0.0 |
| Example 4 | Magnetite | 22.6 | 0.14 | 0.23 | 0.95 | 33.0 | 33.2 | 3.8 | 3.8 | 0.0 |

TABLE 1-continued

| | Composition | F.R. (s) | Groove depth (μm) | Ra (μm) | Roundness | Before stirring D50 (μm) | After stirring D50 (μm) | Before stirring −22 μm Volume ratio (%) | After stirring −22 μm Volume ratio (%) | Generation amount of fine-particle (%) |
|---|---|---|---|---|---|---|---|---|---|---|
| Comparative Example 1 | Manganese ferrite | 28.9 | 0.31 | 0.34 | 0.88 | 33.3 | 32.8 | 1.4 | 2.0 | 0.6 |
| Comparative Example 2 | Magnetite | 25.8 | 0.28 | 0.36 | 0.87 | 55.2 | 50.2 | 0.0 | 1.8 | 1.8 |

(Evaluation of Examples 1 to 4, and Comparative Examples 1 and 2)

FIG. 1 shows an SEM image (3000 magnifications) of the carrier core material of the example 1, and FIG. 2 shows an SEM image (3000 magnifications) of the carrier core material of the comparative example 1. It is found from FIG. 2, that the carrier core material of the comparative example 1 has a plurality of grooves as shown in the carrier core material in a conventional art, and each grain on the particle surface is divided by grooves. Meanwhile, the carrier core material of the example 1 of FIG. 1 has the raised parts of striped pattern extending almost continuously in a plurality of directions while being superposed on one another, and in spite of many irregularities, division of the grains is hardly observed.

From an image analysis of this SEM image, an area of the raised parts of striped pattern extending continuously in a plurality of directions while being superposed on one another on the surface of the carrier core material of the example 1, was calculated, and it was confirmed that this area occupies 80% or more of the whole surface of the particle.

By comparing the example 1 and the comparative example 1, and the example 3 and the comparative example 2, it is found that the carrier core material according to the present invention shows more excellent fluidity, compared with the carrier core material according to the conventional art, even in a case of the particle size distribution of the same degree. This is a more preferable result as the carrier core material.

In the carrier core material according to examples 1 to 4, fine particles are hardly generated even after being stirred by means of a sample mill. This shows that almost no cracks/chipping due to stirring stress is generated in the carrier core material of the present invention. Therefore, the carrier core material of the present invention can be judged to have extremely excellent durability.

Meanwhile, in the carrier core material of the comparative example 1 and the comparative example 2, fine particles (22 μm or less) generated by stirring are twice or more as many as those of the example. Particularly, in the comparative example 2, a value of D50, being 50 vol. %-accumulated particle diameter, is largely reduced.

As described above, the carrier core material according to the present invention shows extremely high durability, and this is because the particle surface is not divided by grooves, and by covering the surface with the raised parts of striped pattern, bonding of the particle surface becomes firm.

By studying the aforementioned examples and comparative examples, it was confirmed that by using the carrier core material according to the present invention, the carrier having excellent fluidity while having surface irregularities effective for imparting electric charge to the toner, and having high durability not allowing the cracks/chipping of the particles to be generated even under an influence of the stirring stress over a long period of time, can be provided.

(An Evaluation Method Used in Evaluating the Examples 1 to 4, and the Comparative Examples 1 and 2)

An evaluation method used in evaluating the examples 1 to 4, and the comparative examples 1 and 2 will be described hereinafter.

<Particle Size Distribution Measurement>

A particle size distribution of the carrier core material was measured by using Microtrac (produced by NIKKISO CO LTD, Model: 9320-X100). Note that in the present invention, the value of D50, being the 50 vol. %-accumulated particle diameter, is defined as an average particle size of the carrier core material.

<Fluidity Degree (F.R) Measurement>

Fluidity degree (F.R.) of the carrier core material was measured by JISZ-2502.

<Groove Depth Measurement> <Average Surface Roughness (Ra) Measurement>

In the present invention, values of the groove depth and average surface roughness (Ra) were calculated by scanning the particle surface by using a laser microscope (produced by OLYMPUS, OLS30-LSU).

The groove depth that exists on the particle surface was calculated, in such a way that a range of 10 μm square was set in the particles of the carrier core material, then an average line was obtained by performing height measurement and depth measurement in this range, and the depth of a position deepest from this average line was defined as the groove depth.

The average surface roughness (Ra) was calculated in such a way that the range of 10 μm square in the particles of the carrier core material was set, then the average line was obtained by performing height measurement in this range, and absolute values of a deviation from the average line to a measurement curved line in this range were added and averaged.

<Calculation of Roundness>

The calculation of roundness of the carrier core material was performed on a computer, for the image observed by a scan type electronic microscope (SEM) by using image analysis software (Soft Imaging System GmbH Corporation "analysis"). Measurement was performed by calculating an average roundness from the roundness of particles, by using the SEM photograph of 500 magnifications.

Note that the roundness is calculated by an area and a circumferential length calculated by image analysis, namely, (roundness)=(4π×area)/(circumferential length×circumferential length).

<Evaluation of Durability>

The evaluation of durability of the carrier core material was performed in such a way that carrier core material sample 100 g was charged into a sample mill (produced by KYORITSU RIKO, Model: SK-M10), and after the carrier core material sample was stirred for 40 seconds at 16000 rpm rotations, a variation of the particle size distribution before/after this stirring was measured.

Note that fine particle generation amount in table 1 is an increase amount in a volume ratio of the particles of 22 μm or less before/after evaluating durability, and is calculated by fine particle generation amount=(volume ratio of particle size 22 μm or less after stirring)−(volume ratio of particle size 22 μm or less before stirring).

Figure 1:
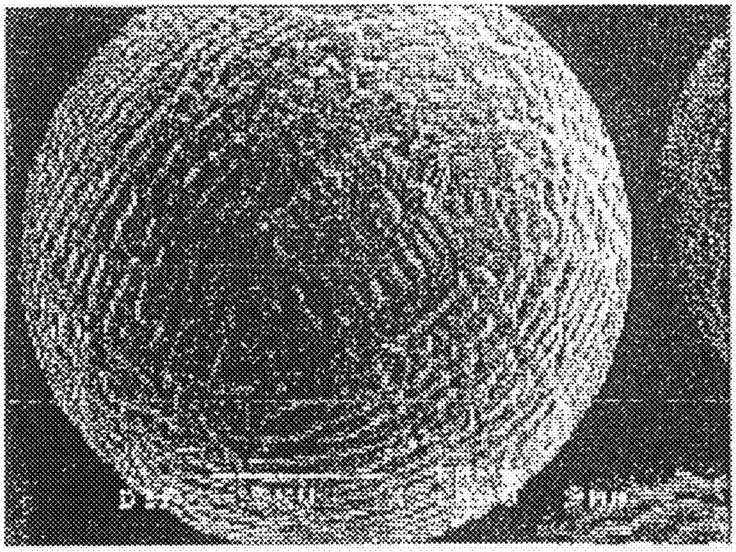
FIG. 1 is an SEM photograph of a carrier core material according to an example of the present invention.
Figure 2:
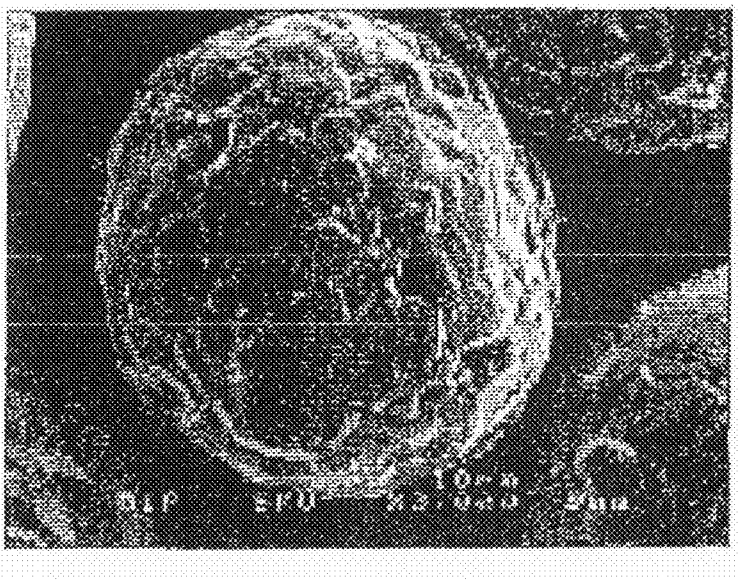
FIG. 2 is an SEM photograph of the carrier core material according to a comparative example of the present invention.

What is claimed is:

1. A manufacturing method of a carrier core material for electrophotographic developer, comprising the steps of:

weighing and mixing prescribed raw material powders, then adding water to this mixture to prepare slurry, and granulating this slurry by spray-drying, to prepare precursor particles;

sintering the precursor particles in a temperature range of 1000 to 1300° C., to prepare a sintered material containing magnetite or manganese ferrite;

making this sintered material drop naturally into 2000° C. or more flame of flammable gas and oxygen from an upper side of this burning flame, or applying thereto heat treatment by dispersing this sintered material into the burning flame by using carrier gas, to form raised parts of striped pattern extending continuously in a plurality of directions while being superposed on one another, on a particle surface of a material to be treated; and obtaining the carrier core material having a desired particle size distribution, by classifying particles after this heat treatment by shifter.

* * * * *